(No Model.)

J. R. PHELPS.
HARNESS.

No. 457,935. Patented Aug. 18, 1891.

Witnesses:

Inventor
James R. Phelps
By Dewey & Co.
Attys

UNITED STATES PATENT OFFICE.

JAMES R. PHELPS, OF SACRAMENTO, CALIFORNIA.

HARNESS.

SPECIFICATION forming part of Letters Patent No. 457,935, dated August 18, 1891.

Application filed April 30, 1891. Serial No. 391,139. (No model.)

*To all whom it may concern:*

Be it known that I, JAMES R. PHELPS, a citizen of the United States, residing at Sacramento, Sacramento county, State of California, have invented an Improvement in Devices for Gaiting Horses; and I hereby declare the following to be a full, clear, and exact description of the same.

My invention relates to a device which is intended to give the proper gait to horses when traveling and prevent their interfering or hitting themselves; and it consists in certain details of construction which will be more fully explained by reference to the accompanying drawings, in which—

Figure 1:
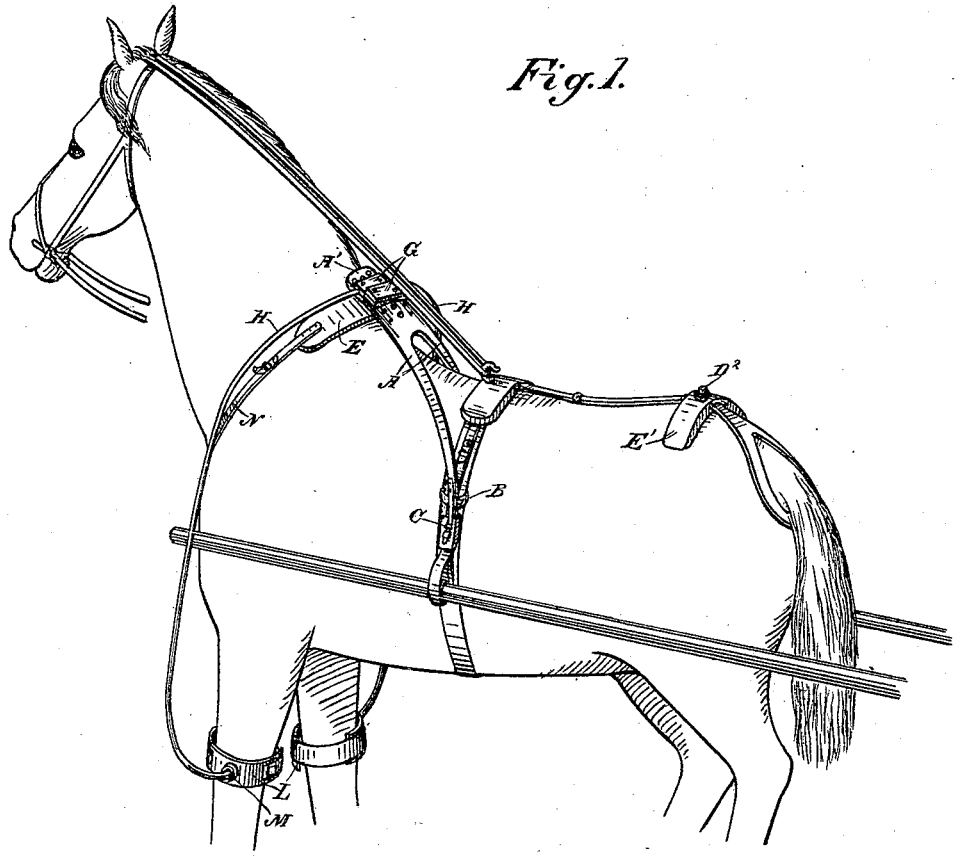
Figure 2:
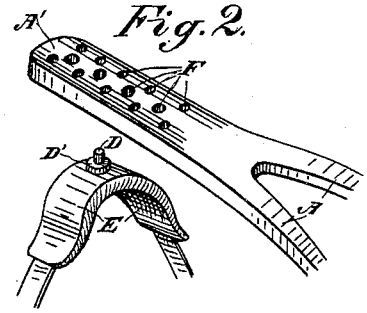
Figure 3:
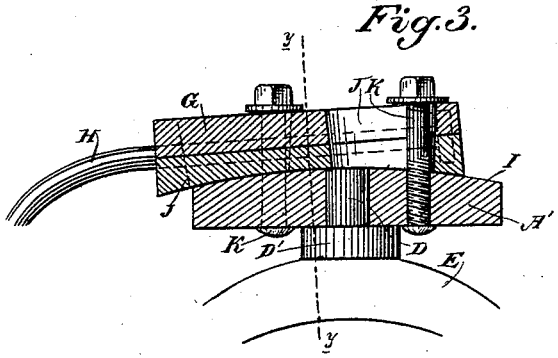
Figure 4:
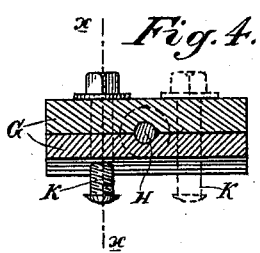

Figure 1 is a view showing the attachment in one position upon the horse. Fig. 2 is a perspective view of the supporting-fork, the pad upon which the front end rests and its adjustment thereon. Fig. 3 is a transverse section showing the adjustment of the swivel-boxes from side to side on the line $xx$ of Fig. 4. Fig. 4 is a section taken across one of the swivel-boxes on the line $y\,y$ of Fig. 3.

A is the frame, the separated ends of which are adapted to extend down upon each side of the horse, where they may be connected with the girth-strap or with other part of the harness or with the shafts, or both, so as to hold these ends in position and prevent their tilting from one side to the other. In the present case I have shown these ends extending downward and fitting in suitable loops B upon the girth and having a strap C connected with the ends of the device, buckling over the transverse holding-straps, so as to prevent any vertical displacement of the ends of the fork.

In Figure 1 I have shown the ends of the fork uniting in a plate A', which extends forward to a point above the withers of the horse, where it rests upon a pin or bolt D, which projects upwardly from a supporting saddle, collar, or pad E, there being a washer or plate D' at the bottom of the pin to prevent the plate chafing upon the pad. The plate A' has numerous holes made in it, as shown at F, either one of which holes may be fitted over the pin D and properly secured, and this device may be adjusted to suit any horse or different arrangements of the harness or vehicle-shafts, the object being to provide a rigid frame-work or support for the leg attachments, which will not be displaced by adjustments or motions of the attachments.

Upon the top of the plate A' are fitted the independent journal-boxes G, which stand transversely across the device, and each of these boxes has an elastic rod H swiveled within it, so as to turn in a horizontal plane. The boxes may be made separate and mounted upon the upper curved surface of the plate, as shown at I, the under side of the boxes fitting this curved surface. Each of these boxes is slotted transversely and vertically, as shown at J, Fig. 3, and screw-bolts K pass through these slots and fit into the plate A beneath. The slots J are of sufficient length to allow either or both the boxes to be moved from one side to the other of the plate. When moved toward one side, the journal-boxes and the swivel-rods H will be turned downward, and when moved toward the other side the rods will be turned upward by reason of the change of angle of the journal in the box G, which is well illustrated at Fig. 3. After passing out of the boxes within which they turn, the arms H are curved downwardly, so as to extend down upon each side of the horse's legs, and to the ends of these rods are attached the clasping straps or devices L, which surround the horse's legs.

The rods H are made elastic, and when the journal-boxes G are set in one position, so that these rods are thrown outward, the tendency will be to pull the legs outwardly and thus spread them and cause the horse to travel "wider," as it is termed. This application is usually made to the hind legs of a horse because he is more liable to interfere with the hind feet and also because he is more liable to strike the front feet by what is termed "overreaching." When applied to the front legs, as illustrated in Fig. 1, these legs may be spread in the same manner, if desired, or if it be found that the horse travels with the front feet too wide apart the journal-boxes may be set so that the arms H act to press against the horse's legs and thus force them toward each other. This is illustrated in Fig. 1, where the ends of the arms are connected with the bands or straps L by ball-and-socket or other universal joint M, which thus allows a free universal motion between the lower ends of the arms and the connecting straps or bands. The same may be applied to the hind legs. The other principal motion of these arms will be the swivel or turning motion within the boxes G and parallel with the line of motion of the legs of the horse when traveling, thus allowing the arms H to swing freely with the motion of the horse's legs and at the same time keep a constant pressure or pull, as the case may be, upon the legs of the horse. If it is only desired to act upon the leg upon one side, it may be done by shifting the boxes G upon their supporting-base, as previously described, so as to throw the plane of travel of the arms H either inward or outward, as may be desired.

If the device is to be employed upon the front legs of the horse, the forked frame A will be fitted so that the meeting ends and support for the journal-boxes will stand above the fore shoulders and withers of the horse; but if it is to be used upon the rear portion it will be reversed and supported in a like manner above the hips and hind legs of the horse. For this purpose a saddle E' is connected with the back-strap and crupper, or with other convenient part of the harness, this saddle or pad having a pin $D^2$, similar to the one described as fixed upon the front, or, if preferred, the whole apparatus may be reversed, so that the forks will project rearwardly from their point of attachment instead of to the front. When extending to the front, the supporting pad or saddle E is provided with proper holding-straps N, which extend down to the breast-plate or other suitable point of attachment, or a collar may be used, so that while the horse is allowed to freely turn his head and neck the apparatus is retained in place with sufficient firmness to prevent an undue movement when the horse is in motion. The forked frame A, being rigidly attached, provides a support which enables me to apply the pressure of the elastic arms, either outwardly or inwardly and either singly or in pairs, without danger of moving the parts out of place or interfering with their action on account of pressure upon one side only.

Having thus described my invention, what I claim as new, and desire to secure by Letters Patent, is—

1. A gaiting device for horses, consisting of swinging arms, a means for connecting their lower ends with the horse's legs, and journal-boxes within which the upper ends of these arms are swiveled to turn or oscillate, a forked supporting-frame for said journal-boxes having its separated ends extending over the horse's back, and means for connecting said ends to the harness or vehicle-shafts, whereby the device is supported and steadied, substantially as herein described.

2. A gaiting device for horses, consisting of the swinging elastic bars, bands or devices by which the lower ends of said bars are connected with the horse's legs, boxes within which the upper ends of the bars are journaled above the horse's back, a forked frame or support fixed above the horse's back having its separated ends extending over the horse's back and connected with the harness or vehicle-shafts, a plate or frame upon which the hinged or journaled ends of the elastic arms are supported, and a means by which the boxes or hinges may be adjusted either forward or backward, substantially as herein described.

3. A gaiting device for horses, consisting of the swinging arms, bands or means by which the lower ends of these arms are connected with the horse's legs to exert an elastic pressure thereon, attachments within which the upper ends of the arms are independently journaled, a supporting-frame fixed to stand rigidly above the horse's back and having a transversely-curved surface upon which the journal-boxes are fitted, transverse slots made in these boxes, and devices by which said boxes are fixed upon the curved supporting surface or frame, whereby the boxes and the swinging arms may be adjusted so as to produce an outward or an inward pressure upon one or both of the horse's legs, substantially as herein described.

4. A gaiting device for horses, consisting of a frame-work rigidly supported above the line of the vehicle-shafts, transverse boxes fixed upon said frame with means for adjusting them forward and back or sidewise independently of each other and above either the hind or fore legs of the horse, and swinging arms having their upper ends journaled or hinged in said boxes or frame and their lower ends connected with the horse's legs, so that an outward or inward pressure may be exerted upon one or both legs, substantially as herein described.

In witness whereof I have hereunto set my hand.

JAMES R. PHELPS.

Witnesses:
S. H. NOURSE,
H. F. ASCHECK.